Patented Sept. 11, 1928.

1,683,701

UNITED STATES PATENT OFFICE.

FRITZ SEEBACH, OF GOTHA, GERMANY, ASSIGNOR TO BAKELITE GESELLSCHAFT MIT BESCHRÄNKTER HAFTUNG, OF BERLIN-CHARLOTTENBURG, GERMANY.

ARTIFICIAL RESIN AND MAKING THE SAME.

No Drawing. Application filed March 21, 1927, Serial No. 177,207, and in Germany March 29, 1926.

It is known that fusible phenolformaldehyde condensation resins which are soluble in organic solvents such as alcohol or acetone can be prepared by condensing formaldehyde and phenols in the presence of small quantities of inorganic or organic bases. For instance aromatic amines have been used. The resins obtained in this way contain generally free phenols or condensation products of phenolic character. Similar resins are formed by employing aromatic amines as condensing agents in the proportion of 1 molecule phenol and ½ molecule aniline, in which process the resin formed requires washing.

The present process consists in causing a reaction between a mixture of phenol, formaldehyde and aromatic amines, the proportion of the phenol to the aromatic amine is above ½ molecule phenol to 1 molecule amine, for instance 0.75, 1, 1.5, 2 or 3 molecules to 1 molecule aniline corresponding to more than 20% of the phenols and the quantity of formaldehyde amounts to 1 molecule or more. If such mixtures are allowed to stand at ordinary temperature crystalline substances are formed which are transformed into nitrogenous resins by further heating. This transformation may be effected with the said mixture before or after the formation of the said crystalline compounds, the crystals may be separated from the liquid in mechanical way, for instance by centrifugalling. The separation can also be omitted.

As phenols the phenol $C_6H_5OH$, the several cresols, or the commercial carbolic acid may be used. As amines, aniline, the several toluidines or mixtures of them, naphthylamine (alpha or beta or mixtures of them) or substituted amines, as anthranilacid, 1 aminonaphthalene 5 sulfoacid may be used. Salts of the amines, as the hydrochloride, sulfate or oxalate of aniline or toluidine may also be employed. Furthermore double salts of the amines with inorganic salts as the double salts anilinehydrochloridezincchloride, toluidinehydrochloridezincchloride may be used. Mixtures of the several amines may also be employed and the double salts may be added with inorganic salts to the amines. As formaldehyde an aqueous solution of formaldehyde (35% or 40%) may be used, or the polymers of formaldehyde, as the several trioxymethylenes.

A modification of the process consists in heating the condensation resins prepared in the described manner with organic acid anhydrides as acetic anhydride, succinic anhydride, phthalic acid anhydride.

If crystallized phenol or cresols are mixed with about 25 parts by weight or aniline with one molecule of formaldehyde instantaneously the temperature rises to about 30 degrees centigrade, the mass solidifies to a crystalline mass and the crystals may be separated from the liquid constituents (water or liquid by products) for instance by decantation or centrifugalling. If the mass or the crystals are heated to temperatures higher than about 40 degrees centigrade, chiefly at about 70 to 80 degrees centigrade they enter into reaction and water is eliminated. The water may be drawn off or expelled by distillation and the resin may be concentrated by evaporation. In this way resins of the so called novolak type which cannot be hardened or converted into insoluble, infusible resins are formed. If the original reaction mixture is heated without having separated the formed water with a reflux cooler resins of the so called resol type are obtained which may be transformed into infusible, unsoluble products by heating.

The resins are characterized by containing a constant proportion of nitrogen. A novolak obtained with aniline, (Example 1) crystallized phenol and formaldehyde has the composition 77.74% C, 5.87% H, 4.5% N; a resol resin obtained with anilinehydrochloridezincchloride has the composition 78.10% C, 6.07% H, 4.5% N (Example 2) which composition corresponds to the formula $C_{26}H_{24}NO_3$ or $C_{27}H_{25}NO_3$. The latter compound has the calculated molecular weight 411, found with phenol as solvent 370 and 380. The resins generally contain more than 3% of nitrogen.

*Example 1.*—120 kilograms of commercial liquid phenol, 40 kilograms of aniline, 160 kilograms of aqueous formaldehyde solution (40%) are agitated for some minutes and then allowed to stand. At about 30 degrees centigrade the mixture solidifies forming agglomerated crystals. After spontaneous rising of the temperatures to about 40 degrees centigrade and reliquefication the mess is agitated for ¼ to ½ hour. The aqueous liquid or layer is separated by decantation or by distillation. The resin may be evaporated until the temperature of about 150 degrees centigrade is reached. After having been cooled the color of the resin is orange-yellow without a peculiar odour, soluble in the common organic solvents as alcohol, acetone, ether, benzene, or mixtures of them. The resin has novolak character.

*Example 2.*—The process is carried out as described in Example 1 and to the aniline 1–2% aniline hydrochloridezincchloride are added. The resin has resol character i. e. it is transformed into the insoluble, infusible product by being heated.

*Example 3.*—3 molecules of cresols and 1 molecule of aniline are mixed with 4 molecules of formaldehyde and agitated. At 25–30 degrees centigrade the mass solidifies to a mass of crystals, whereupon the agitation is stopped. The mass is spontaneously heated and liquefied and water is eliminated. The further treatment as in Example 1.

*Example 4.*—3 molecules of crystallized phenol, 1 molecule of aniline, 4 molecules of paraformaldehyde are melted together and heated until the formation and distillation of water ceases. The resins after having been cooled are brittle, soluble in the common organic solvent of agreeable odour and are suitable as shellac substitute.

*Example 5.*—3 molecules of phenol, 1 molecule of p-toluidine and 4 molecules of formaldehyde (as 40% aqueous solution) are gradually heated to 140–150 degrees centigrade until no water is distilled off. An orange yellow colored resin of a fresh odor similar to that of turpentine is obtained as residue.

*Example 6.*—61 kilograms of formaldehyde (=3 molecules), 75 kilograms of cresol (=3 molecules) and 25 kilograms of technical aniline oil are mixed whereby the temperature rises to 60–70 degrees centigrade. 2 kilograms of aniline hydrochloride dissolved in 4 liters water, are added, and heated and the water is drawn off. The temperature is raised to 180–200 degrees centigrade. This heating may be carried out under diminished pressure. The cooled solidified resin is a novolak, brittle and may be ground with paraformaldehyde, hexamethylentetramine (1–7%) or such like and may then be hardened quickly by heating.

*Example 7.*—280 kilograms of aniline oil (3 molecules) 105 kilograms of liquid phenol (1 molecule) and 225 kilograms of formaldehyde (of 40%) are heated to about 140–150 degrees centigrade (preferably not above). The cooled solidified resin is odourless and well pulverizable.

*Example 8.*—2 molecules of aniline, 2 molecules of phenol and 3 molecules of formaldehyde are gradually heated to 170–180 degrees centigrade, at which temperature suitable portions of 10 per cent phthalic acid anhydride (acetic acid anhydride, succinic acid anhydride calculated for the mixture of aniline and phenol) are added, whereupon the temperature is gradually increased to 240 degrees centigrade. The mass may be poured into suitable molds in which it is allowed to cool. The resin is a novolak of high melting point, having only traces of volatile by-product. When mixed with 1–5 per cent of paraformaldehyde and ground to powder it may be sprayed by means of a stream of heated air with suitable nozzles to the surface of metal objects on which it forms a dense hardened coating.

*Example 9.*—305 kilograms always of liquid phenol, 137 kilograms anthranil acid and 225 kilograms always of formaldehyde (40%) are heated to about 120–130 degrees centigrade (preferably not above) 2% of aniline hydrochloride may be added to the mixture. The resin contains less nitrogen than according to Examples 1 and 2.

The resin is insoluble in water, soluble in aqueous sodium-hydroxide or sodiumcarbonate and forms with aqueous ammonia highly dispersed yellow resin sols.

*Example 10.*—3 molecules of phenols, 1 molecule of 1 aminonaphthalene 5 sulfonic acid, 3 molecules of formaldehyde are heated to temperatures below 100 degrees centigrade. The resin formed is opaque, insoluble in water, may be hardened by heating at suitable temperatures. It is sparingly soluble in sodium carbonate, unsoluble in ammonia solutions and forms with alcohol suspension like solutions. The resin contains less nitrogen than according to Examples 1 and 2.

I claim:—

1. A condensation product of phenols formaldehyde and aromatic amines, fusible and soluble in organic solvents, containing about 77–78% of carbon, 5–6% of hydrogen, 4% of nitrogen, of the molecular weight of about 370–380.

2. The process for preparing fusible resins, soluble in organic solvents containing about 4% of nitrogen which consists in causing to react formaldehyde on phenols and more than ½ molecule of aromatic amines (to 1 molecule of phenol) at ordinary temperature, separating the crystals formed from the liquid and heating the crystals until resins are formed.

3. The process for preparing fusible resins, soluble in organic solvents containing about 4% of nitrogen which consists in heating formaldehyde with phenols and more than ½ molecule of aromatic amines (to 1 molecule of phenol) until resins are formed and heating the resins with organic acid anhydrides.

4. The process for preparing fusible resins, soluble in organic solvents containing about 4% of nitrogen which consists in heating formaldehyde with phenols and more than ½ molecule of aromatic amines (to 1 molecule of phenol) until resins are formed and heating the resins with phthalic acid anhydride.

5. The process for preparing fusible resins, soluble in organic solvents containing about 4% of nitrogen which consists in heating formaldehyde with phenols and more than ½ molecule of aromatic amines combined with acids and with metal salts (to 1 molecule of phenol) until resins are formed.

6. The process for preparing fusible resins, soluble in organic solvents containing about 4% of nitrogen which consists in heating formaldehyde with phenols and more than ½ molecule of aromatic amines (to 1 molecule of phenol) and aromatic amine salts until resins are formed.

In testimony whereof I hereunto affix my signature.

FRITZ SEEBACH.